C. T. BEEBE,
Assignor to THE WITHINGTON & COOLEY MANUFACTURING COMPANY.
CAST STEEL GARDEN RAKE.
No. 10,243. Reissued Nov. 21, 1882.
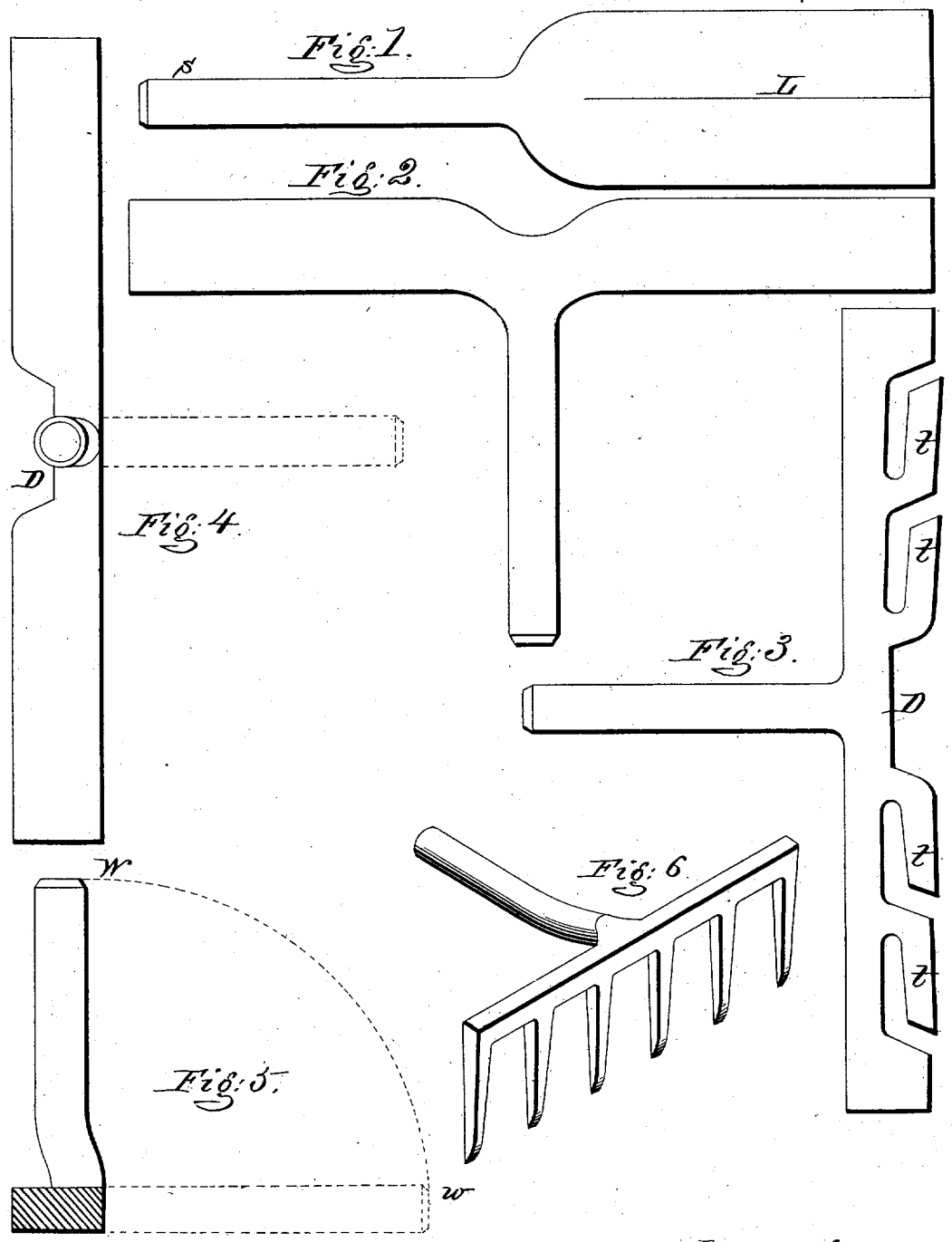
Witnesses:
Jacob Felbel.
Robert Blissert
Inventor:
Calvin T. Beebe
By att.
J. N. McIntire
N. PETERS, Photo-Lithographer, Washington, D. C.

UNITED STATES PATENT OFFICE.

CALVIN T. BEEBE, OF JACKSON, MICHIGAN, ASSIGNOR TO THE WITHINGTON & COOLEY MANUFACTURING COMPANY, OF SAME PLACE.

CAST-STEEL GARDEN-RAKE.

SPECIFICATION forming part of Reissued Letters Patent No. 10,243, dated November 21, 1882.

Original No. 227,473, dated May 11, 1880. Application for reissue filed August 23, 1882.

*To all whom it may concern:*

Be it known that I, CALVIN T. BEEBE, of the city of Jackson, in the county of Jackson and State of Michigan, have invented a new and useful Improvement in Cast-Steel Garden-Rakes, of which the following is a specification.

This invention relates to that class of garden-rakes that are made by cutting, turning out, and drawing the teeth from one side of a bar of steel, while the remaining side forms the bar or head of rake. Heretofore such rakes have been made with an iron shank attached to the bar or head between the two middle teeth by welding. This method is objectionable for the reason that it is difficult to weld iron to steel perfectly. Consequently many shanks are broken off in process of manufacture, and more show imperfect contact at the weld, which, though it may be strong, yet the imperfection makes the rake unsalable.

The object of my invention is to avoid the necessity of welding on a shank, and thus obviate these objections.

The invention consists in making a rake with a shank solid to the bar or head of rake by forging it from the same pattern that the head and teeth are forged from, thus making what may be termed a "solid-shank cast-steel rake," the shank being forged on in place of being welded on.

In practicing my invention so far I have followed this mode or process of manufacture, viz: First, a pattern of proper length for a given number of teeth is cut from a bar of steel of the thickness usually used for making cast-steel rakes, but of double the usual width. On one end of this the shank for the rake is drawn, as shown in Figure 1 at S. The remaining portion of pattern is then split along the line L nearly to the shank, as shown in Fig. 1. The two sides of pattern are next spread apart and straightened out, as shown in Figs. 2 and 3, the shank projecting from the edge of bar that is to form the top of rake-head in the center and at right angle to the same. The depression D is next formed in the bar opposite to the shank for the space between the two middle teeth of rake. The teeth may now be cut, ready to be turned out and drawn, as shown in Fig. 3 at *t t*. The next operation is to change the position of shank as shown in Fig. 3 to a position perpendicular to the side of the rake as shown in Fig. 4. This is done by twisting that portion of the head between the two middle teeth one-quarter way round, as shown by the dotted lines in Fig. 5 at *w w*, the stock between said teeth having been left heavier than required when finished, so that after twisting the marks may be hammered out while working this portion of the head to the proper size. The twisting thus of that portion of the head between the two middle teeth to place the shank of rake in its proper position is an important feature of the improvement, as it enables me to get a shank solid to the head of the rake. After the shank is in proper position the teeth previously cut may be turned out and drawn in the usual way.

I do not confine myself to cutting the teeth before the shank is twisted into place; but if for any reason it is better to twist shank into position before cutting the teeth it may be done, and, in fact, the teeth may be drawn, if desired, before twisting shank into the position required for a finished rake.

Fig. 6 represents on a reduced scale a finished rake head and shank made in accordance with my invention.

What I claim is—

1. As a new article of manufacture, a cast-steel garden-rake the projecting shank of which is formed integrally with the head, substantially as and for the purpose set forth.

2. The hereinbefore-described method of making a rake having the shank and head integral, consisting essentially in drawing out one end of the blank to form the shank, slitting and spreading apart that portion of the blank which is to form the head and teeth, and setting down the middle thereof, as shown, and cutting the teeth and turning over the shank portion, all substantially as set forth.

Witness my hand this 5th day of August, 1882.

CALVIN T. BEEBE.

In presence of—
J. M. ROOT,
W. C. LEWIS.